United States Patent
Blondiaux et al.

(10) Patent No.: US 8,542,442 B2
(45) Date of Patent: Sep. 24, 2013

(54) ISOTROPIC ZERO-ORDER DIFFRACTIVE FILTER

(75) Inventors: Nicolas Blondiaux, Neuchâtel (CH); Mickaël Guillaumee, Neuchâtel (CH); Raphaël Pugin, Auvernier (CH); Ross Stanley, Epalinges (CH); Alexander Stuck, Wettingen (CH); Harald Walter, Horgen (CH)

(73) Assignee: Centre Suisse d'Electronique et de Microtechnique SA—Recherche et Developpement, Neuchatel (CH)

( * ) Notice: Subject to any disclaimer, the term of this patent is extended or adjusted under 35 U.S.C. 154(b) by 1140 days.

(21) Appl. No.: 12/116,233

(22) Filed: May 7, 2008

(65) Prior Publication Data

US 2008/0278815 A1 Nov. 13, 2008

Related U.S. Application Data

(60) Provisional application No. 60/924,276, filed on May 7, 2007.

(51) Int. Cl.
G02B 5/18 (2006.01)
G03H 1/02 (2006.01)

(52) U.S. Cl.
USPC .................................. 359/567; 359/2; 283/86

(58) Field of Classification Search
USPC ................. 359/568, 573, 575, 562, 566–567, 359/2, 574; 283/86
See application file for complete search history.

(56) References Cited

U.S. PATENT DOCUMENTS

| | | | |
|---|---|---|---|
| 3,858,977 A | 1/1975 | Baird et al. | |
| 4,484,797 A * | 11/1984 | Knop et al. | 359/568 |
| 5,059,245 A | 10/1991 | Phillips et al. | |
| 6,870,678 B2 * | 3/2005 | Tompkin et al. | 359/569 |
| 2006/0056474 A1* | 3/2006 | Fujimoto et al. | 372/43.01 |
| 2006/0180805 A1* | 8/2006 | Lutz et al. | 257/40 |
| 2007/0183045 A1* | 8/2007 | Schilling et al. | 359/567 |
| 2007/0285782 A1* | 12/2007 | Stuck et al. | 359/569 |

FOREIGN PATENT DOCUMENTS

| | | |
|---|---|---|
| EP | 775 142 A1 | 4/2007 |
| WO | 03/059643 A1 | 7/2003 |
| WO | WO 2005042268 A1 * | 5/2005 |
| WO | 2006/038120 A1 | 4/2006 |
| WO | 2007/137438 A1 | 12/2007 |

* cited by examiner

Primary Examiner — Stephone Allen
Assistant Examiner — Kimberly N Kakalec
(74) Attorney, Agent, or Firm — Young & Thompson

(57) ABSTRACT

The present invention relates to an isotropic zero-order diffractive color filter, to a method to manufacture an embossing tool and to a method to manufacture such a filter. The zero-order diffractive color filter comprises diffractive microstructures and a wave-guiding layer, wherein the diffractive microstructures possess a short range ordering over at least four times the period of the microstructures, and the diffractive microstructures possess a long range disordering over length scales of more than 100 μm.

20 Claims, 6 Drawing Sheets

ISOTROPIC ZERO-ORDER DIFFRACTIVE FILTER

TECHNICAL FIELD

The present invention relates to zero-order filters, sometimes called resonant gratings, and more particularly to an isotropic zero-order diffractive colour filter, to a method to manufacture an embossing tool and to a method to manufacture such a filter.

BACKGROUND OF THE INVENTION

Zero-order diffractive filters (ZOF) are used in different applications. These filters are based on the resonant reflection of a leaky waveguide. The documents related to colour filters, especially to security devices based on ZOF, are discussed in the following paragraphs.

In U.S. Pat. No. 4,484,797 zero-order diffractive filters are described for use as authenticating or security devices. Illuminated even with non-polarized, polychromatic light such devices show unique colour effects upon rotation and therefore can be clearly identified. ZOF with no colour effect upon rotation are not described.

The WO 03/059643 also describes very similar ZOF for use in security elements. The elements have the same drawbacks as the filters in the U.S. Pat. No. 4,484,797.

Security devices with at least two stacked ZOF with a spacing between the filters that allows interference to take place are described in WO2006/038120. Such ZOF show stronger colour effects compared to ZOF mentioned before. Again, ZOF with no colour effect upon rotation are not described.

Other well known optical filter techniques are based on multilayer interference effects. Flat dielectric layer stacks or Fabry-Perot type layer stacks (interference filters) which are disclosed in U.S. Pat. No. 3,858,977 are the most prominent examples. For a strong colour effect an interference layer stack of at least three layers is needed.

SUMMARY OF THE INVENTION

It is an object of the present invention to mitigate at least some of the drawbacks of the state of the art. In particular, it is an aim of the present invention to provide ZOF showing no colour effect upon rotation and to provide manufacturing processes for obtaining such filters.

These objectives are achieved by an isotropic ZOF.

Such ZOF possess diffractive, sub-wavelength microstructures with a short range ordering and a long range disordering. The optical characteristics of such ZOF is isotropic, thus the reflection and/or transmission spectra show no change upon rotation.

Such ZOF can be used in a variety of fields. Examples of possible applications are security devices (e.g. for banknotes, credit cards, passports, tickets, document security, anti-counterfeiting, brand protection and the like), heat-reflecting panes or windows or spectrally selective reflecting pigments.

The invention also relates to a method to manufacture an embossing tool for embossing such microstructures.

The invention also relates to a method to manufacture an isotropic zeroorder diffractive colour filter.

The invention also relates to a pigment containing such isotropic zero-order diffractive colour filters.

The invention also relates to a security device, in particular for banknotes or passports, containing such isotropic zero-order diffractive colour filters.

BRIEF DESCRIPTION OF THE DRAWINGS

FIG. 2b shows the corresponding Fourier Transformation (FT) analysis of the image of FIG. 2a.

DETAILED DESCRIPTION OF THE INVENTION

Figure 1:
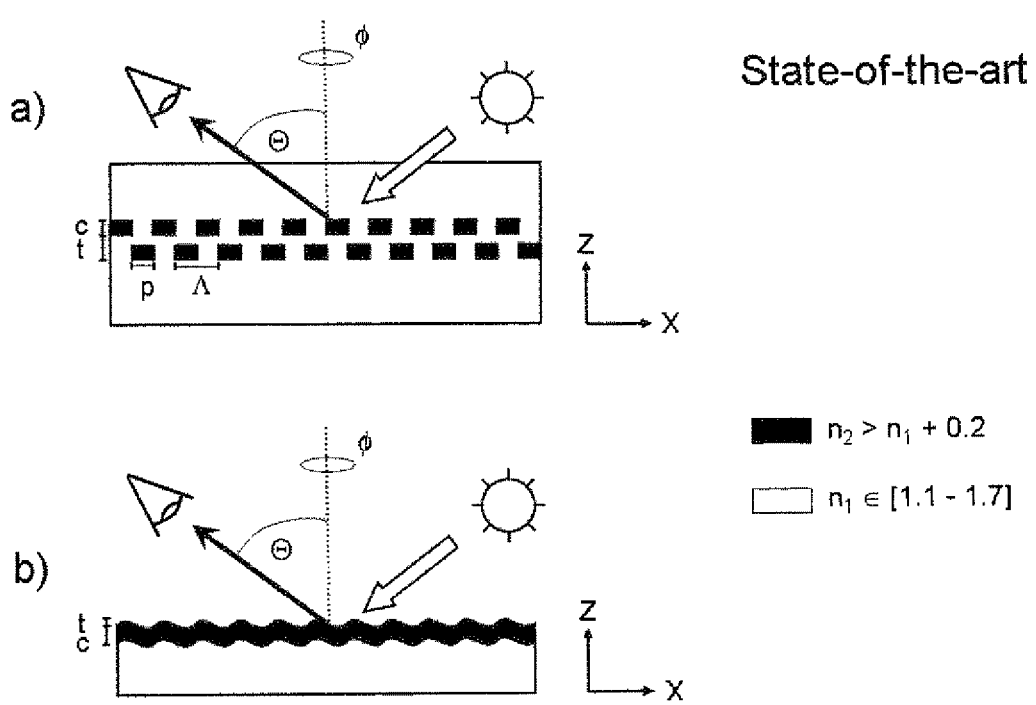
FIG. 1 shows schematic side view drawings of known ZOF, with a) rectangular and b) sinusoidal grating shape. Black denotes HRI (high refractive index) material, white LRI (low refractive index) material. $\Lambda$ is the period and t the depth of the grating, $\rho$ the width of the lower grating line, $\phi$ the rotational angle, $\Theta$ the viewing angle and c the thickness of the HRI layer.

Although ZOF used as security devices offer a high level of security for special designs of the security devices, it would be advantageous to have a ZOF which varies the colour only upon tilting. In other applications an isotropic reflection characteristic of ZOF would be beneficial, too. Within this document such a ZOF is called an isotropic ZOF. Such an isotropic ZOF enables a design of a security device with a logo or writing that varies the colour upon rotation (state-of-the-art linear ZOF) and that is embedded in a background with no colour effect upon rotation (isotropic ZOF). Of course the design can be inverted with a colour effect upon rotation of the background and a colour stable logo or writing. At the same time and in both cases both areas would have a colour change upon tilting. The whole security device could be manufactured with the same technique as the two colour effects are based on the same physical effect.

Still another possible application for isotropic ZOF is in optically variable pigments. For this application a microstructured (e.g. with a linear grating) wave-guiding layer is split in small flakes or pigments which can be used in inks. Such ZOF pigments are described in WO2007137438A1 which is incorporated herein by reference. One possibility to produce such pigments is to emboss the microstructure in a first layer coated on a substrate, wherein the layer can be dissolved in a certain solvent. The embossed substrate is then coated with a waveguiding second layer which is not solvable in the solvent. Next the first layer is dissolved in the certain solvent which leads to a breaking of the micro-structured waveguiding second layer in small flakes or pigments.

Typically the size of such pigments is in the range of a few $\mu m^2$ up to a few hundred $\mu m^2$. For inks smaller pigments are preferred. In most cases these pigments show no uniform orientation after the ink is applied to a substrate. Thus the colour and colour effect of the object to which the ink is applied is a mixture of the colours which are seen in the different rotational viewing direction. This distinctly reduces the colour contrast and therefore the visibility of the colour effect. Colour effect pigments based on isotropic ZOF with no colour effect upon rotation according to this invention circumvent the problem of the orientation of the pigments. An advantage compared to state-of-the-art optically variable inks (OVIs) based on thin film interference (e.g. disclosed in U.S. Pat. No. 5,059,245) is that ZOF pigments need only one layer whereas OVIs are made of at least five layers. Therefore ZOF pigments are potentially cheaper to produce. Further such pigments can be distinctly thinner. Preferred the thickness of the pigments or flakes is in the range of 50 nm up to 500 nm, especially preferred between 100 nm and 250 nm. Due to the lower thickness isotropic ZOF pigments can be made smaller while keeping the aspect ratio of thickness to size unchanged. This aspect ratio is important to realise pigments which align parallel to a surface during a printing process, e.g. during screen printing. Typically the size of such isotropic ZOF pigments or flakes is in the range of $1\times1$ $\mu m^2$ up to $200\times200$ $\mu m^2$, preferred it is in the range of $1\times1$ $\mu m^2$ up to $50\times50$ $\mu m^2$, especially preferred in the range of $2\times2$ $\mu m^2$ up to $5\times5$ $\mu m^2$. Pigments of the especially preferred size can be used even in gravure printing processes. Of course asymmetric shapes like rectangular, ellipse etc. are possible for such pigments or flakes, too.

a) Isotropic ZOF:

State-of-the-art ZOF consist of microstructures—more precisely parallel or crossed grating lines—with a depth t and a period Λ that is in most cases smaller than the wavelength of light for which the filter is designed and a waveguiding layer (see FIG. 1). The latter has the thickness c and is made of a material with high index of refraction $n_{high}$ (HRI-layer) surrounded by material with lower index of refraction $n_{low}$ (LRI-layer) in the range of 1.1-1.7, wherein $$n_{high} > n_{low} + 0.2. \quad (1)$$

The waveguide layer can be provided with the grating or the grating can be placed on top or below the layer. The material above and below the waveguide layer can have a different index of refraction. One can even be air. In order for zero-order diffraction to take place a number of parameters have to be adjusted including grating period, grating depth, thickness of the waveguiding layer, the fill factor or duty cycle f.f.=p/Λ and the grating profile or shape (rectangular, sinusoidal, triangular or more complex). The high index of refraction layer together with the grating acts as a leaky waveguide. Such ZOFs illuminated by polarised or unpolarised polychromatic visible light are capable of separating zero-order diffraction output light from higher order diffraction output light. A part of the incident light is directly transmitted and a part is diffracted and then trapped in the waveguiding layer. Some of the trapped light is rediffracted out such that it interferes with the transmitted part. At a certain wavelength and angular orientation φ a resonance occurs which leads to complete destructive interference. No such light is transmitted. Thus ZOFs possess characteristic reflection and transmission spectra depending on the viewing angle Θ and the orientation of the grating lines with respect to the observer φ. For each pair of angles they directly reflect a particular spectral range or colour. As long as the materials used possess no absorption the transmission spectra are the complement of those in reflection. Contrary to first or higher order diffraction devices, in zero-order diffractive filters the light is reflected at a viewing angle which is equal to the incidence angle. More details concerning zero-order diffractive filters can be found in M. T. Gale, "Zero-Order Grating Microstructures" in R. L. van Renesse, Optical Document Security, 2nd Ed., pp. 267 287. It is known to manufacture ZOFs as laminated foils in roll to roll processes with thermally evaporated ZnS as the HRI layer deposited on foil substrates which were microstructured by hot-embossing. Such filters are used as security devices.

For an isotropic ZOF, with reasonable reflection efficiency, a diffractive microstructure with a short range ordering over at least four times the period of the microstructure is needed. Preferred is a short range ordering over at least 10 times the period. In other words, the microstructure must possess a well defined length scale for diffraction to couple light into the wave-guiding layer and out again. Without being bound to theory it is believed that a short range ordering of less than four times the period of the microstructure results in a dramatic drop of the diffraction efficiency. At the same time no long range order or rotational symmetry should be present. Preferred the microstructure possesses a translational symmetry. As a result no colour change upon lateral moving of the filter in the plane of the filter occurs if the viewing angle is kept constant. For a homogeneous colour impression of an isotropic ZOF no ordering extending over a length scale is allowed that corresponds to the resolution of the human eye. This threshold depends on the distance. It is approximately 25 µm for typical viewing distances of 10-20 cm. In a preferred embodiment of this invention, the ordering extends at a maximum length scale of 10 µm. Nevertheless microstructures with a short range ordering between 25 µm and 100 µm are within the scope of this patent as a device with an isotropic ZOF using such microstructures still shows no colour effect upon rotation. The colour effect is superposed by a glittering effect. Such glittering effects are widely used to give objects a noble appearance. Therefore an isotropic ZOF as claimed in this document possesses short range ordered microstructures over a length scale x, wherein x fulfils equation 2.

$$4\times\Lambda < x < 100 \text{ µm} \quad (2)$$

Figure 2A:
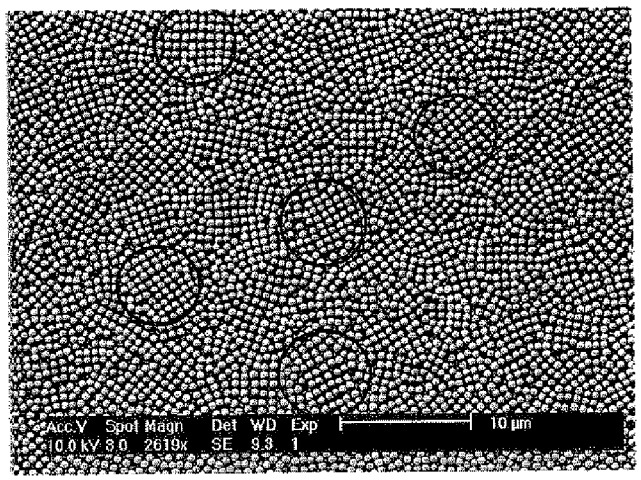
FIG. 2a shows a scanning electron microscope (SEM) image of a silica bead layer with a bead diameter of 595 nm, with a short range ordering and a ling rang disordering, deposited on a Si-wafer substrate by spin-coating from ethanol solution. Some areas with short range ordering are highlighted in an exemplary manner by using black circles.
Figure 2B:
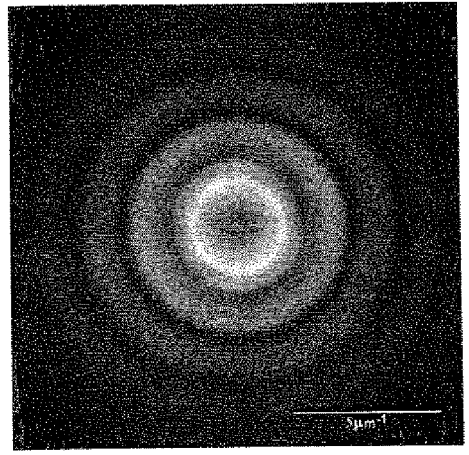
Figure 2C:
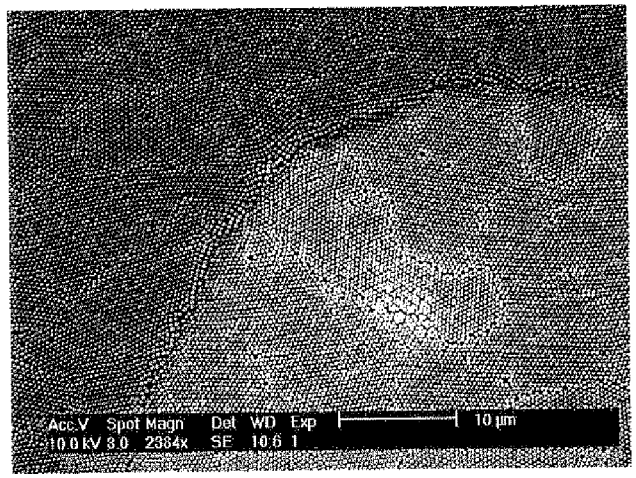
FIG. 2c shows a SEM image of a silica bead layer with a bead diameter of 403 nm with a short range ordering and a long range disordering, deposited on a Si-wafer substrate by spin-coating from ethanol solution.
Figure 2D:
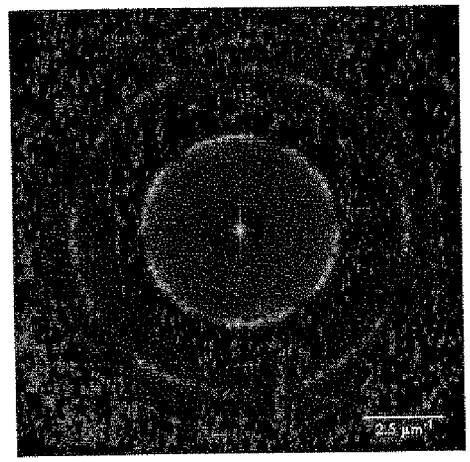
FIG. 2d shows the corresponding FT analysis of the image of FIG. 2c.

The Fourier transformation (FT) of such microstructures is more or less a ring, or a series of rings. FIG. 2 shows SEM images of bead layers fulfilling the criterion and the corresponding FT-spectra. FIGS. 2a and 2b show the result for a bead layer (bead diameter 595 nm, periodicity ca. 650 nm) with a mostly cubic short range ordering over smaller length scale compared to the bead layer in FIGS. 2c and 2d (bead diameter 403 nm, periodicity 340 nm). The latter possesses a mostly hexagonal short range ordering. Nevertheless, both FT-analyses of the SEM images show the described ring structure. In contrast, e.g. quasi-crystals lack a translational symmetry but still give diffraction spots in the Fourier Transformation.

As the short range ordering extends over areas of at least 600 nm and a maximum of 100 µm the periodic microstructures are built up of grains which lead to light scattering. In FIG. 2a some grains are highlighted by black circles. The scattering modifies the colour effect but does not destroy it if the scattering efficiency is kept low.

Depending on the desired colour effect or desired spectral characteristic of the ZOF the period is adjusted. For effects in the UV/visible/NIR spectral range diffractive microstructures with a period in the range of 150 nm to 2 µm are needed. The period of the microstructures in FIG. 2 can be adjusted by the bead diameter. Useful parameters of the isotropic ZOF are summarised in table 1:

TABLE I

| parameter | suitable range | preferred range | especially preferred range |
|---|---|---|---|
| period of the microstructure Λ | 150 nm-2000 nm | 250 nm-1200 nm | 250 nm-100 nm |
| Short range ordering length scale x | 4 × Λ < x < 100 µm | 10 × Λ < x < 25 µm | 10 × Λ < x < 10 µm |
| depth t | 30 nm-700 nm | 80 nm-500 nm | 80 nm-300 nm |
| Thickness of waveguiding layer c | 30 nm-500 nm | 80 nm-250 nm | 80 nm-200 nm |

Combining such a microstructure with a wave-guiding layer leads to the isotropic ZOF which reflects a certain part of the electromagnetic spectrum independently of the rotational angle.

In one embodiment the microstructure is combined not only with one waveguiding layer, but with a layer stack. Examples are multilayers of high-low index of refraction material. E.g. a ZnS—MgF$_2$—ZnS coating produces stronger colour effects compared to a single ZnS layer as described in the WO2006/038120. Other possible layer stacks are combinations of the waveguiding layer with a mirror layer and a transparent spacer layer as known from the EP1775142A1. All these combinations are capable to produce strong colour effects upon tilting with no colour effect upon rotation.

It is not necessary that the microstructure is made up of bead-shaped structures. This is just one possibility which can be realised as described later in this document. All microstructures fulfilling the parameters of table 1 and the criterion in equation 2 are suitable and are within the scope of this invention.

b) Methods to Manufacture ZOF.

The microstructures used in the invention can be obtained from self-assembled beads, from self-assembly structures of polymers or block copolymers, by etching a substrate through a mask comprising such microstructures, or by embossing a substrate by means of an embossing tool comprising such replicated microstructures.

Figure 3:
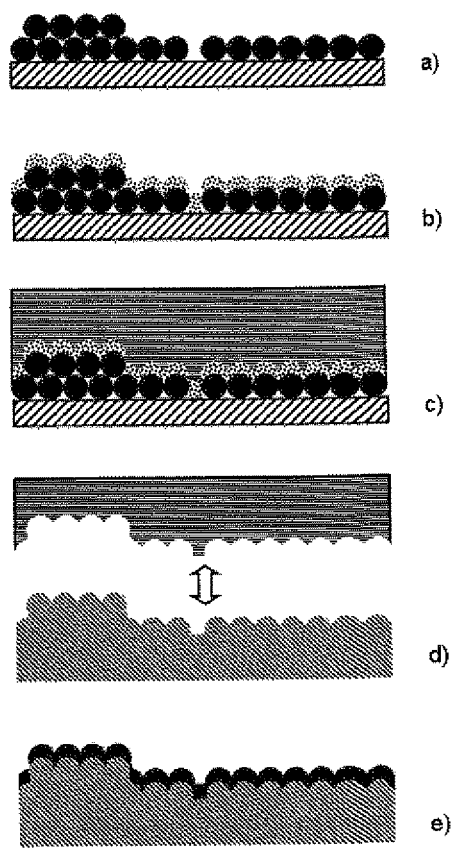
FIG. 3 is a schematic drawing of one possible manufacturing method of the invention.

One possible way to realise such isotropic ZOF is depicted in FIG. 3. In one embodiment the microstructures with the short range ordering but large range disordering are based on self-assembled bead layers as described next. The first step is to deposit beads of uniform size on a substrate. Optionally the obtained layer can be post-treated e.g. sintered. If the right deposition method and parameters are chosen, a homogeneous layer with the desired short range ordering and long range disordering is obtained. Homogeneous samples of up to 3-inch size were realised. FIG. 2 shows SEM images of such layers made up of silica beads (purchased from microParticles GmbH) which were deposited by spin-coating from ethanol solution. The deposition was done at room temperature. Other possible beads are e.g. polystyrene, melamine. The beads having a diameter of 403 nm and a poly-dispersity index of 0.02 were spin-coated on a 3-inch Si-wafer and sintered for 5 h at 800° C. The deposition parameters were chosen to fully coat the substrate with beads. These parameters can vary, depending on the short range order desired. Typically, a concentration of 5 to 10% in weight per volume and a spin speed between 1000 and 2000 round per minutes (rpm) has been used. A first spinning at 500 rpm for 2 seconds is also necessary to obtain homogeneous films within the whole wafer. Most parts of the substrate were coated with a monolayer but small areas showed double layer formation (see FIG. 3a). As these areas are on the order of several tenths of micrometers the steps from monolayer to bi-layer do not disturb the light diffraction distinctly.

For mass production of such microstructures—e.g. in roll-to-roll embossing or UV replication processes—the microstructures must be transferred into an embossing tool. Said structures can be formed by a bead layer, by using polymer demixing or block-copolymer phase separation, or by etching the substrate through a mask comprising such structures. The structures can also be micro- and nano-structures obtained by the combination of polymer demixing with block-copolymer phase separation.

Figure 4A:
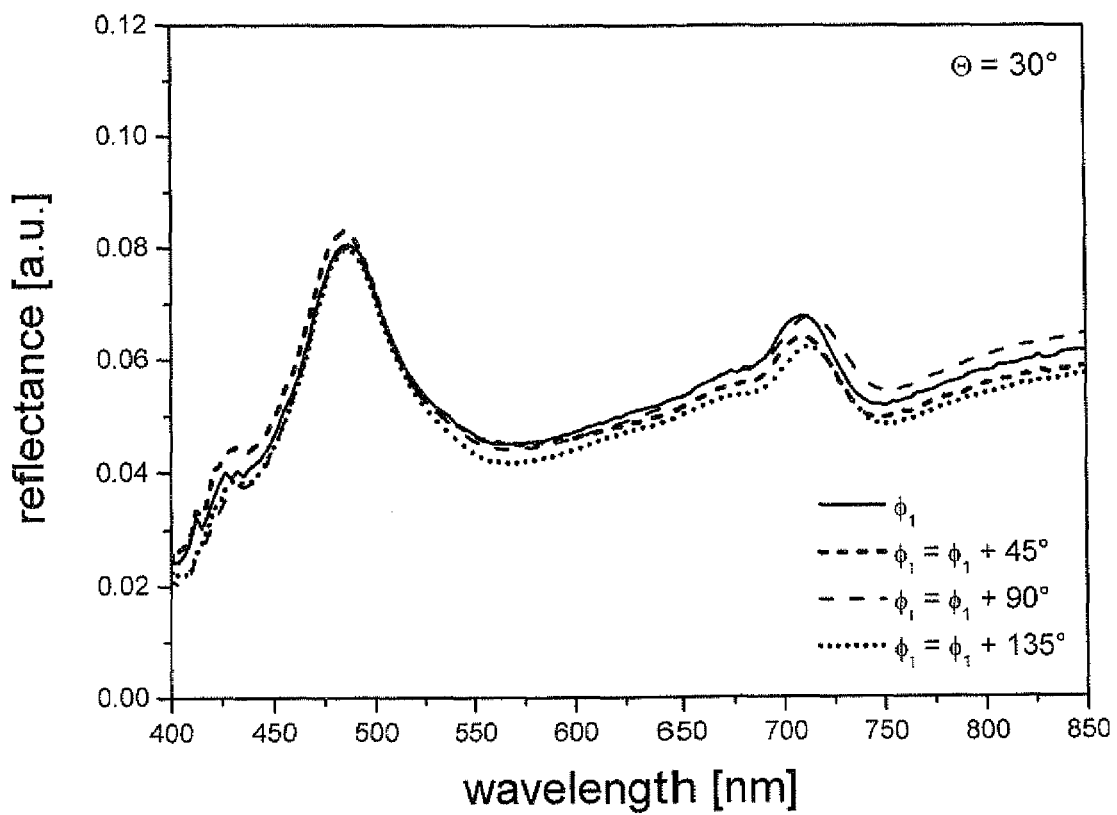
FIGS. 4a and 4b are reflection spectra of an isotropic ZOF based on the bead layer shown in FIG. 2c) at a) varying rotation angle $\phi$ but fixed viewing angle of 30° and at b) varying viewing angle $\Theta$ but fixed rotational angle.
Figure 4B:
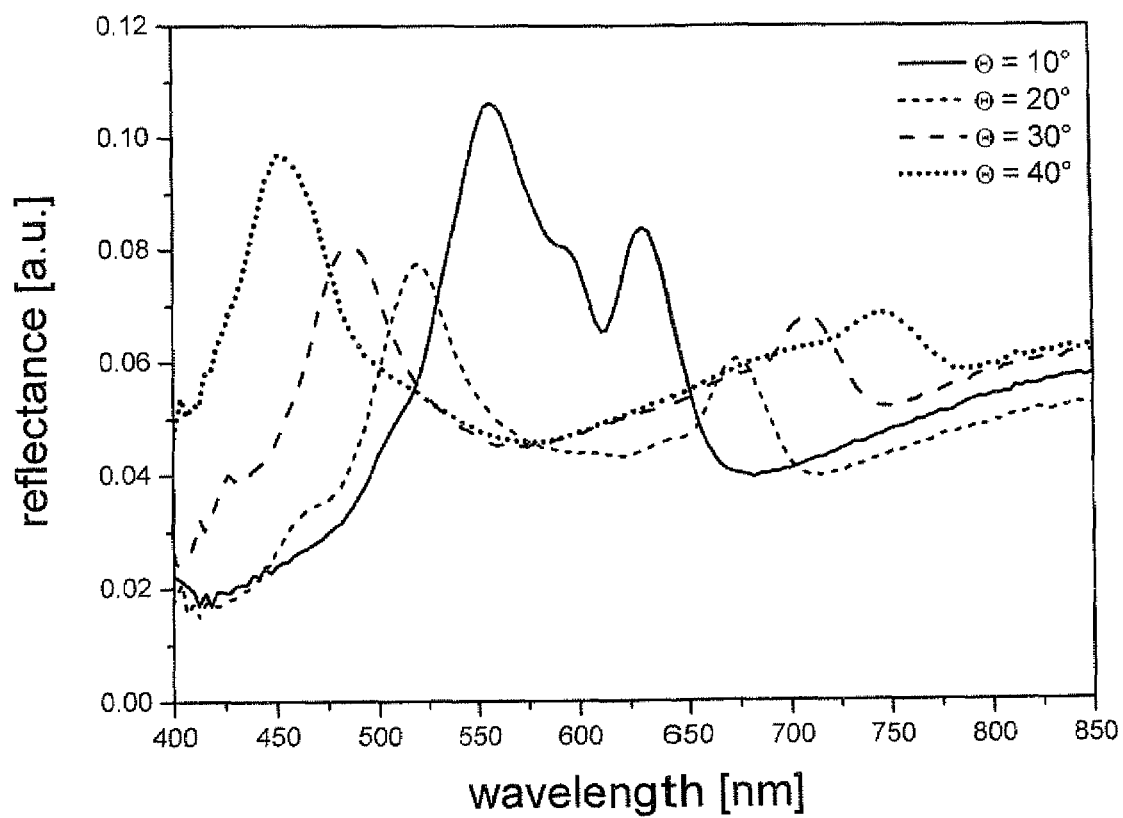
Figure 5:
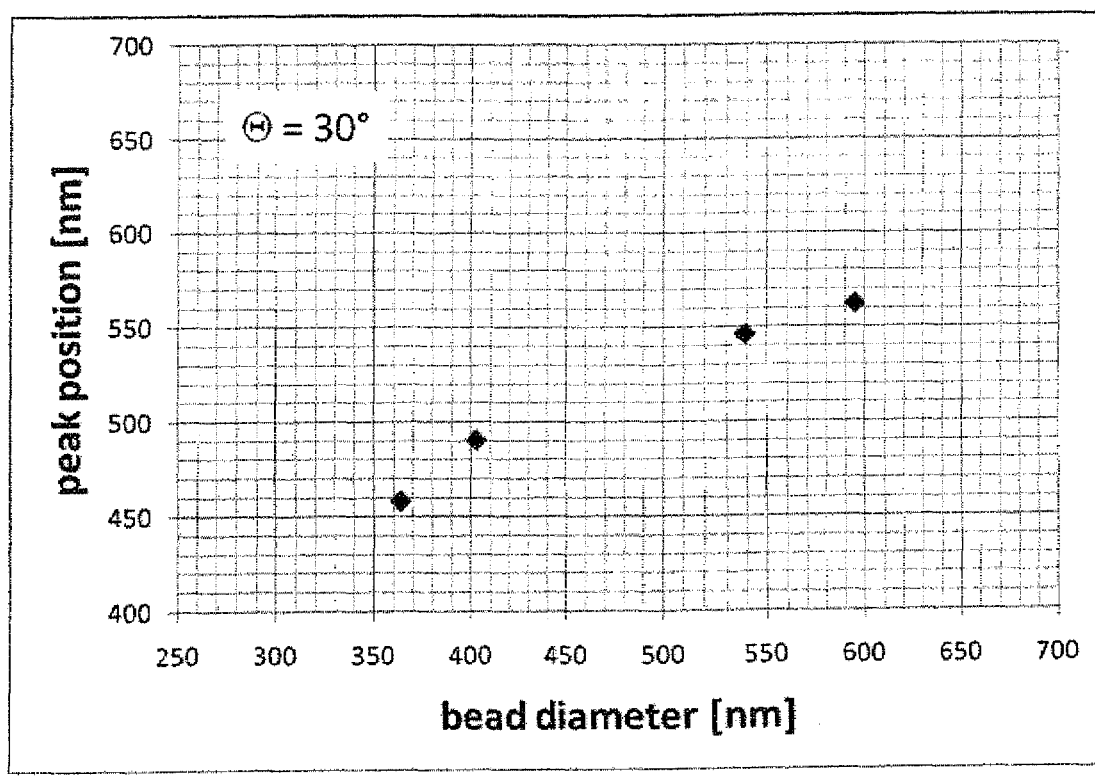
FIG. 5 shows a plot of the position of the most prominent peak in the reflection spectrum as a function of the beat diameter measured at a viewing or tilting angle of 30°.

Therefore, a silver layer of approximately 300 nm thickness was thermally evaporated on top of the bead layer made up of 403 nm beads as a starting layer for the subsequent electroforming step (FIG. 3b). The evaporation angle was set to 90° (perpendicular to the surface plane). The thickness was set to 300 nm (more than half the bead diameter) to ensure a complete covering of the bead coated substrate with the silver layer. If a lower or higher depth of the microstructure is needed an additional step has to be performed. The depth of the microstructure can be reduced by coating the bead layer with an additional layer. Preferred are evaporation or sputtering processes which lead to a reduced depth due to the correlated surface of the coated layer. Possible materials are MgF2, SiO2 and the like. An increased depth can be realised by etching processes as known in the art wherein the beads act as etch masks (so called colloidal lithography techniques). Other possible materials for the starting layer are e.g. gold or nickel. The silver layer was used as a starting layer for an electroforming step to produce an embossing Ni-Shim. A Nickel layer of 400 µm thickness was grown in an electroforming bath (FIG. 3c). As the beads were partially embedded in the silver layer, a silver etch step was used to remove the beads together with the silver layer. Due to the structure correlation in the evaporation process the surface of the remaining Ni-Shim still possesses the bead structure. It is a state-of-the-art process to recombine large area shims and embossing rolls for mass production in roll-to-roll embossing machines from such 3-inch shims. Further it is known to recombine different microstructures to form logos and the like. Such machines are widely used for the manufacturing of holograms or other diffractive optically variable image devices (DOVIDs). The 3-inch shim was used to emboss the microstructures (with the short range ordering but long range disordering) in polymer substrate or foil (FIG. 3d). This can be done e.g. by pressing the shim into a PC substrate of 250 µm thickness at a temperature of about 156° C. and applying a load of about 80 kg/cm2 for approximately 10 minutes. After cooling down to 125° C. the load is removed and the shim separated from the PC substrate. Suitable materials for the polymer substrate or foil are thermoplastic polymers. E.g. the polymer substrate or foil can be made of acrylonitrile butadiene styrene ABS, polycarbonate PC, polyethylene PE, polyetherimide PEI, polyetherketone PEK, poly(ethylene naphthalate) PEN, poly(ethylene therephtalate) PET, polyimide PI, poly(methyl methacrylate) PMMA, poly-oxy-methylene POM, mono oriented polypropylene MOPP, polystyrene PS, polyvinyl chloride PVC and the like. In a further embodiment the microstructures are embossed in a roll-to-roll process in an embossable layer which is deposited on a carrier substrate, e.g. the above mentioned polymer substrate of foils. This is state-of-the-art in the manufacturing of holograms. Possible materials for this embossable layer are synthetic organic polymer material such as ethylene vinyl acetate, polyvinyl acetate, polystyrene, polyurethane and combinations thereof. The embossed PC foil showed a nice and isotropic light diffraction. After deposition of a ZnS waveguiding layer of approximately 90 nm thickness in a thermal evaporation step a zero-order diffractive filter with no rotational colour change was realised (FIG. 3e). As expected a colour change upon tilting is still present showing the characteristic peak splitting of ZOF. In ZOF with linear gratings this peak splitting upon tilting can be seen by tilting the filter with the grating lines perpendicular to the viewing direction as depicted in FIG. 1). In FIG. 4a reflection spectra taken at different rotational angles φ and at a fixed tilting angle Θ of 30° are shown for a ZOF based on the 403 nm bead layer shown in FIG. 2c. FIG. 4b demonstrates the colour shifting effect with spectra taken at viewing angles of 10° up to 40°. These plots demonstrate nicely the described optical characteristics of the filter. FIG. 5 shows the position of the most prominent peak in the reflection spectrum as a function of the bead diameter measured at a tilting angle of 30°. As can be seen the reflection peak shifts to higher wavelength with increasing bead diameter. All four measured samples produce a reflection peak in the visible spectral range.

Other non-limiting examples of possible materials for the wave-guiding layer are $TiO_2$, $Si_3N_4$, $ZrO_2$, $Cr_2O_3$ or ZnO. All transparent materials fulfilling the requirements of the needed index of refraction (see equation 1) and transparency may be used.

In another embodiment the microstructures with the short range ordering but large range disordering are manufactured by self-assembly processes in polymer blend or block copolymer films. Phase separation of polymer blends occurs when the system is brought from a stable state (single phase) to an unstable or meta-stable state (biphasic). There are, however, different ways to induce phase separation experimentally. the temperature-quench and solvent-quench methods. In the first method, the starting system is a binary polymer blend prepared in the one-phase region to form a homogeneous blend. The system is then subjected to a rapid change in temperature (temperature quench) to bring the blend from the one phase to the two phase region of its phase diagram. One great advantage of the temperature quench approach is that the slow diffusion kinetics of polymer melts allows the different stages of phase separation to be monitored. The second method uses a ternary system composed of two polymers and a common solvent for both polymers. At low polymer concentrations, the polymer chains are well dissolved and do not interact with neighbouring polymer chains. Upon removal of the solvent, the polymer concentration increases until a threshold value above which the system phase separates. The system then undergoes phase separation until it is completely depleted of solvent. The polymer films made using the solvent quench approach are typically made by means of spin coating. A well known system for polymer demixing is a blend of polystyrene (PS) and poly-methyl-methacrylate (PMMA). Solutions of PS/PMMA (30/70) w/w dissolved in toluene were prepared and spin coated on clean silicon wafers Then, the polystyrene phase was removed by rinsing the sample in cyclohexane, a selective solvent for PS. To modify the size of the domains, we finely tune in a systematic manner:

the polymer concentration of the blend solution between 0.5% and $5\%_{w/v}$ ($1\%_{w/v}$=10 mg/mL).

the molecular weight $M_w$ of both PS and PMMA between 3 kDa and 600 kDa.

Samples prepared from $1\%_{w/v}$ PS (101 kDa)/PMMA (106 kDa) solution coated with 3000 rpm spin velocity were characterised by AFM. Fourier analysis and the power spectrum (2D iso PSD) of the image were made. The length-scales of the domains were then obtained by calculating the invert of the peak positions. Characteristic length-scales of 900 nm were determined. Due to the large period of 900 nm of these microstructures the reflection characteristic of the isotropic ZOF lies in the near infra red spectral region, thus it is not visible to the human eye. Smaller length scales of the microstructures based on the self-assembly processes can be realised by lower concentrations, changing solvent, tuning molecular weight of polymers or by block-copolymer self-assembly processes resulting in isotropic ZOF with reflection peaks in the visible spectral range. Such processes are described e.g. in C. J. Hawker and T. P. Russell "Block Copolymer Lithography: Merging "Bottom-Up" with "Top-Down" Processes" in MRS bulletin, 30, 2005, p. 952-966. Multiscale surface patterning may also be envisioned via e.g. the combination of polymer demixing with block-copolymer phase separation. Thus, both micro- and nano-surface structures could be simultaneously prepared with a high control over size and morphologies. As already described for beads, both micro- and nano-structures with controlled depth (e.g. higher aspect ratio) can be fabricated using self-assembly polymer structures as etch masks for the transfer of the micro- or nano-pattern into the underlying material (e.g. using Deep Reactive Ion Etching or Sputtering techniques). Additionally, this process allows the fabrication of long range disordered polymeric microstructures containing short range ordered block-copolymer nanostructures.

Of course, the scope of this invention is not limited to the mentioned methods for manufacturing the microstructures with the short range ordering but large range disordering as defined above. Alt methods capable of producing such microstructures are possible. Examples of such methods are electron-beam lithography or laser writing.

The invention claimed is:

1. A zero-order diffractive color filter, comprising: diffractive microstructures and a wave-guiding layer, wherein the diffractive microstructures are ordered over a length scale x, wherein x is such that: $4 \times \Lambda < x < 100$ μm, where $\Lambda$ is the period of said microstructures, and the diffractive microstructures are randomly arranged over length scales of more than 100 μm, in such a way that said zero-order diffractive color filter is isotropic and has color effects upon tilting with no color effect upon rotation.

2. The zero-order diffractive colour filter according to claim 1, wherein x is such that:

$$10 \times \Lambda < x < 25 \text{ μm}.$$

3. The zero-order diffractive colour filter according to claim 2, wherein the period of the microstructure $\Lambda$ is comprised between 150 and 2000 nm.

4. The zero-order diffractive colour filter according to claim 1, wherein the period of the microstructure $\Lambda$ is comprised between 150 and 2000 nm.

5. The zero-order diffractive colour filter according to claim 1, wherein a depth of said microstructures is comprised between 30 and 700 nm.

6. The zero-order diffractive colour filter according to claim 1, wherein said microstructures are obtained from beads made of a material selected from the group comprising silica, polystyrene and melamine.

7. The zero-order diffractive colour filter according to claim 1, wherein said microstructures are obtained from self-assembly structures of polymers or block copolymers.

8. The zero-order diffractive colour filter according to claim 1, wherein said microstructures are obtained by etching through a mask comprising such microstructures.

9. The zero-order diffractive colour filter according to claim 1, wherein said microstructures are obtained by embossing a substrate by means of an embossing tool comprising such microstructures.

10. The zero-order diffractive colour filter according to claim 1, wherein the wave-guiding layer has a thickness comprised between 30 and 500 nm.

11. A pigment containing isotropic zero-order diffractive colour filters according to claim 1.

12. A security device, in particular for banknotes or passports, containing isotropic zero-order diffractive colour filters according to claim 1.

13. The zero-order diffractive colour filter according to claim 1, wherein x is such that:

$$10 \times \Lambda < x < 10 \, \mu m.$$

14. The zero-order diffractive colour filter according to claim 1, wherein a period of the microstructure $\Lambda$ is comprised between 250 and 1200 nm.

15. A method to manufacture an embossing tool for embossing the microstructures of isotropic zero-order diffractive color filters comprising the steps of:—providing a substrate comprising microstructures,—depositing on said substrate a starting layer for an electroforming step,—electroforming an embossing tool from the substrate,—optionally removing the starting layer in an etch process,—optionally recombining the electroformed tool to realize a larger tool and/or a tool wherein the microstructures form a design, and wherein said zero-order diffractive color filter comprises diffractive microstructures and a wave-guiding layer, wherein the diffractive microstructures are ordered over a length scale x, wherein x is such that: $4 \times \Lambda < x < 100 \, \mu m$, where $\Lambda$ is the period of said microstructures, and the diffractive microstructures are randomly arranged over length scales of more than 100 μm, in such a way that said zero-order diffractive color filter is isotropic and has color effects upon tilting with no color effect upon rotation.

16. The method according to claim 15, wherein said structures are microstructures formed by a bead layer.

17. The method according to claim 15, wherein said structures are microstructures obtained by using polymer demixing or block-copolymer phase separation.

18. The method according to claim 15, wherein said structures are micro- and nano-structures obtained by the combination of polymer demixing with block-copolymer phase separation.

19. The method according to claim 15, wherein said structures are obtained by etching the substrate through a mask comprising such structures.

20. A method to manufacture an isotropic zero-order diffractive color filter comprising the steps of:—embossing a diffractive microstructure, in an embossable substrate or a substrate with an embossable layer, and—coating the embossed substrate with a wave-guiding layer comprising a high refractive index, wherein said zero-order diffractive color filter comprises diffractive microstructures and a wave-guiding layer, wherein the diffractive microstructures are ordered over a length scale x, wherein x is such that: $4 \times \Lambda < x < 100 \, \mu m$, where $\Lambda$ is the period of said microstructures, and the diffractive microstructures are randomly arranged over length scales of more than 100 μm, in such a way that said zero-order diffractive color filter is isotropic and has color effects upon tilting with no color effect upon rotation.

* * * * *